UNITED STATES PATENT OFFICE.

WILLIAM R. LUCKEY, OF EVADALE, TEXAS.

PROCESS OF MAKING FERTILIZER.

No. 838,036.  Specification of Letters Patent.  Patented Dec. 11, 1906.

Application filed September 5, 1905. Serial No. 277,005.

*To all whom it may concern:*

Be it known that I, WILLIAM R. LUCKEY, a citizen of the United States, residing at Evadale, in the county of Jasper and State of Texas, have invented certain new and useful Improvements in an Improved Process of Making Fertilizer, of which the following is a specification.

This invention relates to fertilizers, and has for its principal object to provide a fertilizing composition or compost which will not only enrich in a marked degree the soil upon which it is used, but will destroy cutworms and certain other forms of vermin injurious to vegetation.

Another object of the invention is to provide a composition of the character referred to which will raise the temperature of the soil upon which it is used, thereby permitting of safely planting seed therein earlier than is otherwise possible.

A further object of the invention is to provide a fertilizer which will absorb moisture from the air and maintain the soil treated therewith in a relatively moist condition, thereby enabling growing plants to resist the effect of drought.

A still further object of this invention is to provide a fertilizing material which will slowly give off carbon dioxid for a long period of time.

Other objects of this invention are to provide a fertilizing composition which is free from offensive odor, harmless to handle, and particularly efficacious in disintegrating clay and other heavy soils of similar consistency.

In the preparation of my improved fertilizing material or compost I mix together the following ingredients in the proportions stated: potassium hydrate, five pounds; ammonium nitrate, five pounds; copper sulfate, five pounds; soda-ash, five pounds. I next dissolve the mixture in from twenty to thirty gallons of water. I then form a relatively thin layer of organic material—such as straw, litter, manure, cane-mash, brewers' waste, garbage, or the like—and sprinkle this with the solution prepared as above described. I then sprinkle the layer with dry sodium chlorid and slaked lime. Another similar layer of organic matter is then spread above the first, and this is similarly treated. The process is repeated until a ton of fertilizing material is produced, this quantity requiring for its production the entire solution produced, as described, and about one hundred pounds each of sodium chlorid and slaked lime. To this material is preferably, though not essentially, added strong sulfuric acid in the proportion of five pounds of the acid to a ton of the compost. This acid is readily absorbed by the porous vegetable matter employed, and as it forms a relatively small proportion of the mass it comes in contact with the alkaline salts employed very slowly, so that carbon dioxid produced by the combination of the acid and the carbonate in the soda-ash is evolved in minute quantities for a long period of time.

The layers of material are left for from thirty to ninety days to permit the organic matter to thoroughly decompose. When garbage, straw, manure, or brewers' waste is used, thirty days is ordinarily sufficient for this. For cane-mash a much longer time is ordinarily required.

My improved composition produced as above described accomplishes, in a reliable and satisfactory manner the objects hereinbefore stated and provides a fertilizing material which can be easily and cheaply prepared and which has great efficiency in the enrichment of soils treated therewith.

Having thus described my invention, what I claim, and desire to secure by Letters Patent, is—

1. The process of producing an improved fertilizing composition which consists in treating layers of organic matter, successively superimposed one upon another with a solution of a mixture containing approximately equal parts of potassium hydrate, ammonium nitrate, copper sulfate and soda-ash, then sprinkling the layers with sodium chlorid and slaked lime and permitting the layers to remain superimposed one upon another until the organic material is decomposed.

2. The process of producing an improved fertilizing composition which consists in treating layers of organic matter, successively superimposed one upon another with a solution of a mixture containing approximately equal parts of potassium hydrate, ammonium nitrate, copper sulfate and soda-ash, then sprinkling the layers with sodium chlorid and slaked lime, then adding sulfuric acid and permitting the layers to remain superimposed one upon another until the organic matter is decomposed.

In testimony whereof I affix my signature in presence of two witnesses.

WILLIAM R. LUCKEY.

Witnesses:
BENJAMIN GORE,
J. F. LUCKEY.